(12) United States Patent
Moon et al.

(10) Patent No.: US 7,583,428 B2
(45) Date of Patent: Sep. 1, 2009

(54) TRANSMISSIVE ACTIVE GRATING DEVICE

(75) Inventors: Yong-kweun Moon, Yongin-si (KR); Jong-hwa Won, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 11/852,342

(22) Filed: Sep. 10, 2007

(65) Prior Publication Data
US 2008/0239464 A1 Oct. 2, 2008

(30) Foreign Application Priority Data
Mar. 27, 2007 (KR) .................. 10-2007-0030034

(51) Int. Cl.
G02F 1/03 (2006.01)
G02B 5/18 (2006.01)

(52) U.S. Cl. ............................ 359/254; 359/566
(58) Field of Classification Search ......... 359/245–247, 359/254, 258, 563, 566
See application file for complete search history.

(56) References Cited

U.S. PATENT DOCUMENTS

2002/0154377 A1* 10/2002 Pepper .................. 359/245

* cited by examiner

Primary Examiner—William C Choi
(74) Attorney, Agent, or Firm—Sughrue Mion, PLLC

(57) ABSTRACT

Provided is a transmissive active grating device that transmits light or diffracts light according to an applied voltage. The transmissive active grating device includes: an electro optical material layer which transmits light; a first electrode formed on a bottom surface of the electro optical material layer; and an array of a plurality of second electrodes arranged on a top surface of the electro optical material layer in parallel with each other.

13 Claims, 10 Drawing Sheets

TRANSMISSIVE ACTIVE GRATING DEVICE

CROSS-REFERENCE TO RELATED PATENT APPLICATIONS

This application claims priority from Korean Patent Application No. 10-2007-0030034, filed on Mar. 27, 2007, in the Korean Intellectual Property Office, the disclosure of which is incorporated herein in its entirety by reference.

BACKGROUND OF THE INVENTION

1. Field of the Invention

Apparatuses consistent with the present invention relate to a transmissive active grating device, and more particularly, to a transmissive active grating device transmitting or diffracting a light according to an applied voltage.

2. Description of the Related Art

Active grating devices, which perform as gratings for diffracting light according to an applied voltage, are combined with optical systems in order to be used as light modulators in laser printers or display devices.

FIG. 1 is a perspective view of a conventional reflective active grating device 10. Referring to FIG. 1, the conventional reflective active grating device 10 includes a plurality of ribbon layers 14 that are suspended from a substrate 11 in parallel with each other. FIGS. 2A and 2B are cross-sectional views showing a structure and an operation of the conventional reflective active grating device 10 in more detail. Referring to FIGS. 2A and 2B, the conventional reflective active grating device 10 includes an insulating layer 12 formed on the substrate 11, an electrode layer 13 formed on the insulating layer 12, the ribbon layers 14 suspended from a top surface of the substrate 11, and reflective layers 15 formed on top surfaces of the ribbon layers 14. The reflective layers 15 can be formed of a metal material having a superior conductivity and a high reflectivity such as aluminum, and thus, can perform as both a reflective layer and an electrode layer.

In this structure, if a voltage is not applied to the electrode layer 13 and the reflective layers 15, all of the ribbon layers 14 are located at the same height as shown in FIG. 2A since the reflective layers 15 remain still. Therefore, light incident onto the conventional reflective active grating device 10 is reflected by the reflective layers 15 that are formed respectively on the ribbon layers 14. Hence, if a shutter is appropriately installed on a light path of the reflected light, a dark state occurs.

On the other hand, when a positive voltage (or a negative voltage) is applied to the electrode layer 13 and a negative voltage (or a positive voltage) is alternately applied to every second reflective layer 15, every second ribbon layer 14 moves toward the substrate 11 due to an electrostatic attraction between the reflective layers 15 corresponding to every second ribbon layer 14 and the electrode layer 13 as shown in FIG. 2B. Then, the conventional reflective active grating device 10 performs as a reflective diffraction grating as shown in FIG. 3. Therefore, the light incident onto the conventional reflective active grating device 10 is diffracted and reflected by the reflective layers 15 respectively on every second ribbon layers 14. Hence, since a shutter is installed on a light path of 0th order diffracted light, ±1st or high order diffracted light are not blocked, and thus, the light proceeds. Therefore, in this case, a bright state occurs.

However, the conventional reflective active grating device 10 is a three-dimensional structure involving a mechanical movement, and thus, conventional reflective active grating device 10 must undergo a micro-electro-mechanical system (MEMS) process which is a very delicate process. In addition, since the conventional reflective active grating device 10 involves a mechanical movement, a response speed of the conventional reflective active grating device 10 is limited to a few KHz. Moreover, since the conventional reflective active grating device 10 reflects the incident light, the light path is bent and the optical system becomes complex.

SUMMARY OF THE INVENTION

Exemplary embodiments of the present invention provide a transmissive active grating device that is formed by a simple fabrication process, and which does not involve mechanical movement, and provide a transmissive active grating device having a high response speed.

According to an aspect of the present invention, there is provided a transmissive active grating device including: an electro optical material layer transmitting light; a first electrode formed on a bottom surface of the electro optical material layer; and an array of a plurality of second electrodes arranged on a top surface of the electro optical material layer in parallel with each other.

The second electrodes may be arranged with a predetermined interval therebetween.

A distance between the second electrodes may be equal to the width of a second electrode or greater.

A voltage may be applied independently to each of the second electrodes.

A predetermined number of second electrodes that are adjacent to each other may form an array set, and the voltage may be applied independently to each of the array sets of the second electrodes.

The second electrodes in an array set may be electrically connected to one electrode pad.

The electro optical material layer that transmits the light may be formed of at least one of KLTN, $LiNbO_3$, and KTN.

According to another aspect of the present invention, there is provided a spatial optical modulator that modulates an incident light according to an input signal, the spatial optical modulator including: a transmissive active grating device having the above structure; and a shutter that blocks a 0th order diffracted light and transmits ±1st or higher order diffracted lights among the light transmitting through the transmissive active grating device, or transmits the 0th order diffracted light and shields the ±1st or higher order diffracted lights.

BRIEF DESCRIPTION OF THE DRAWINGS

The above and other exemplary aspects and advantages of the present invention will become more apparent by the following detailed description of exemplary embodiments thereof with reference to the attached drawings in which.

DETAILED DESCRIPTION OF EXEMPLARY EMBODIMENTS OF THE INVENTION

Figure 1:
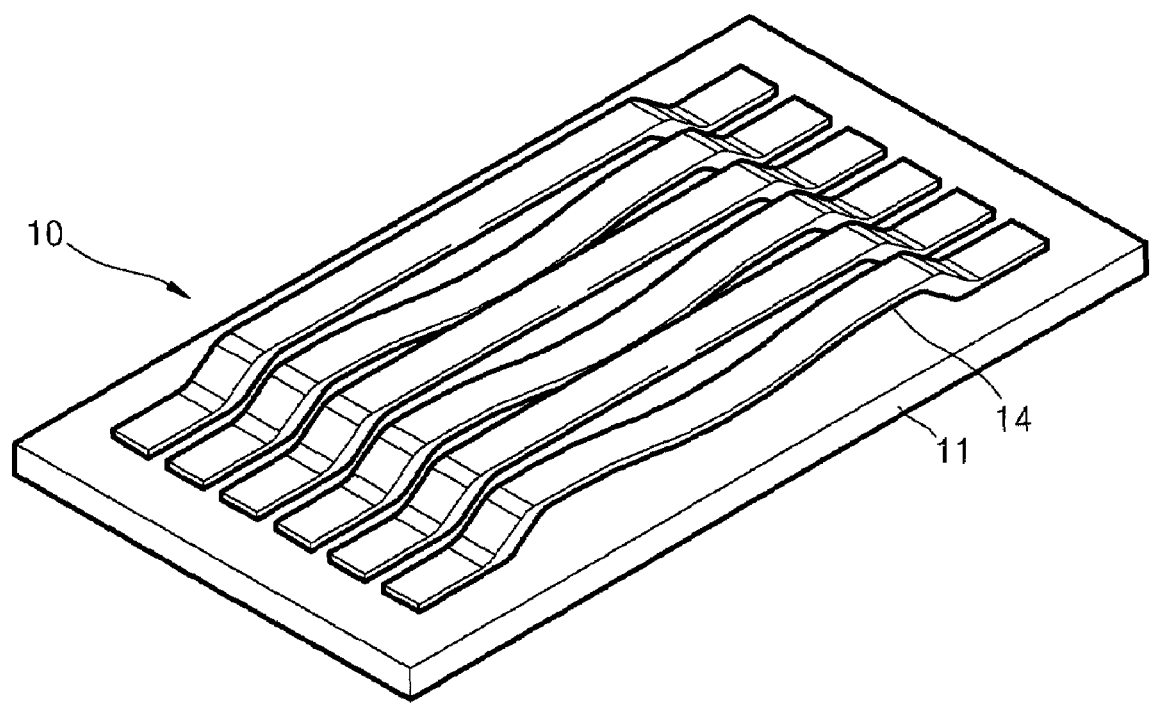
FIG. 1 is a perspective view of a conventional reflective active grating device.
Figure 2A:
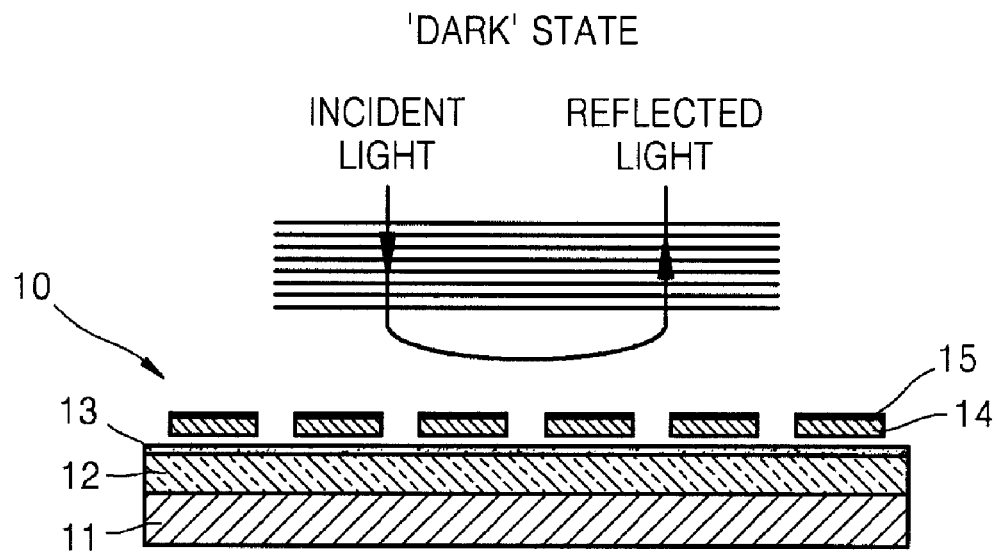
FIGS. 2A and 2B are cross-sectional views showing a structure and an operation of the conventional reflective active grating device of FIG. 1.
Figure 2B:
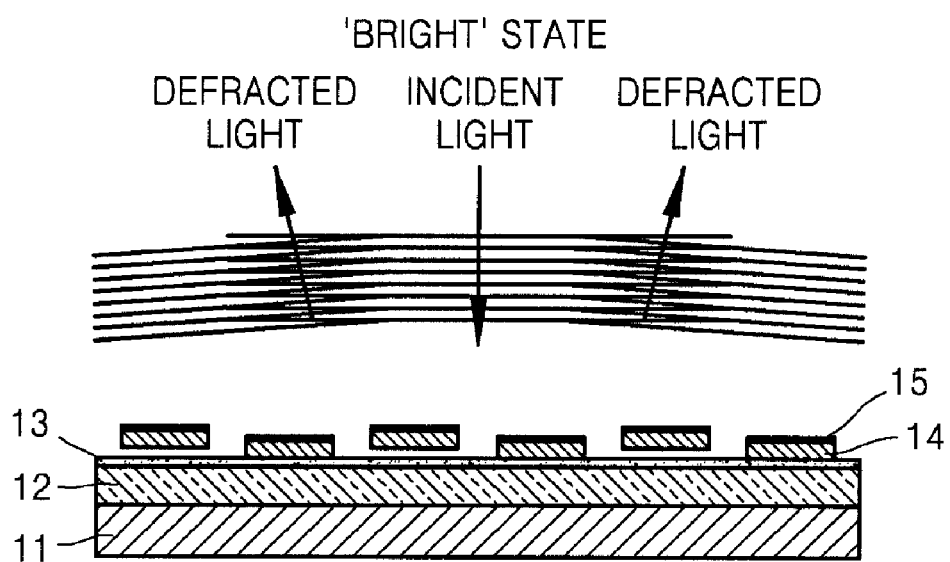
Figure 3:
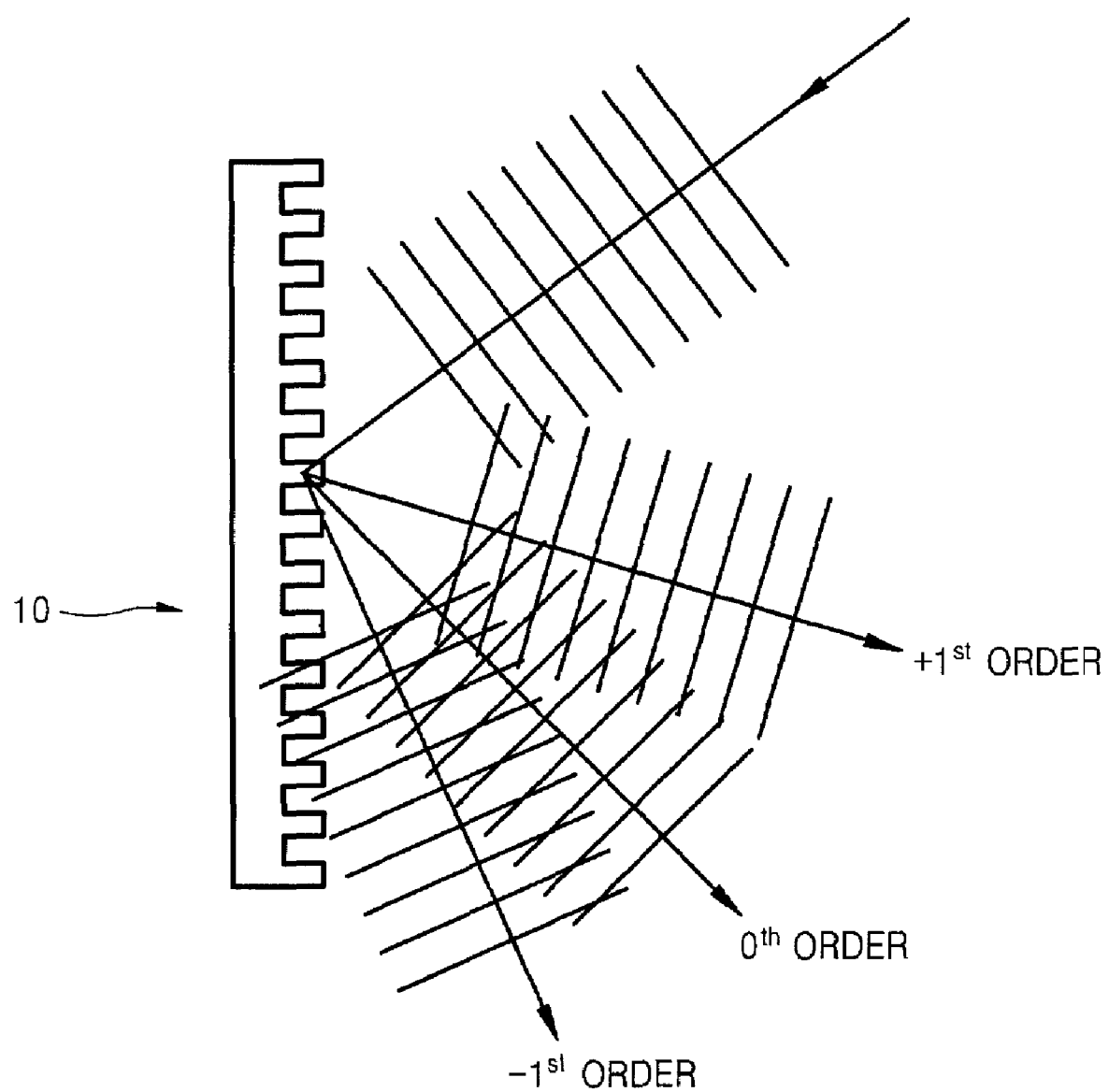
FIG. 3 shows light diffracted and reflected by the conventional reflective active grating device of FIG. 1.
Figure 4:
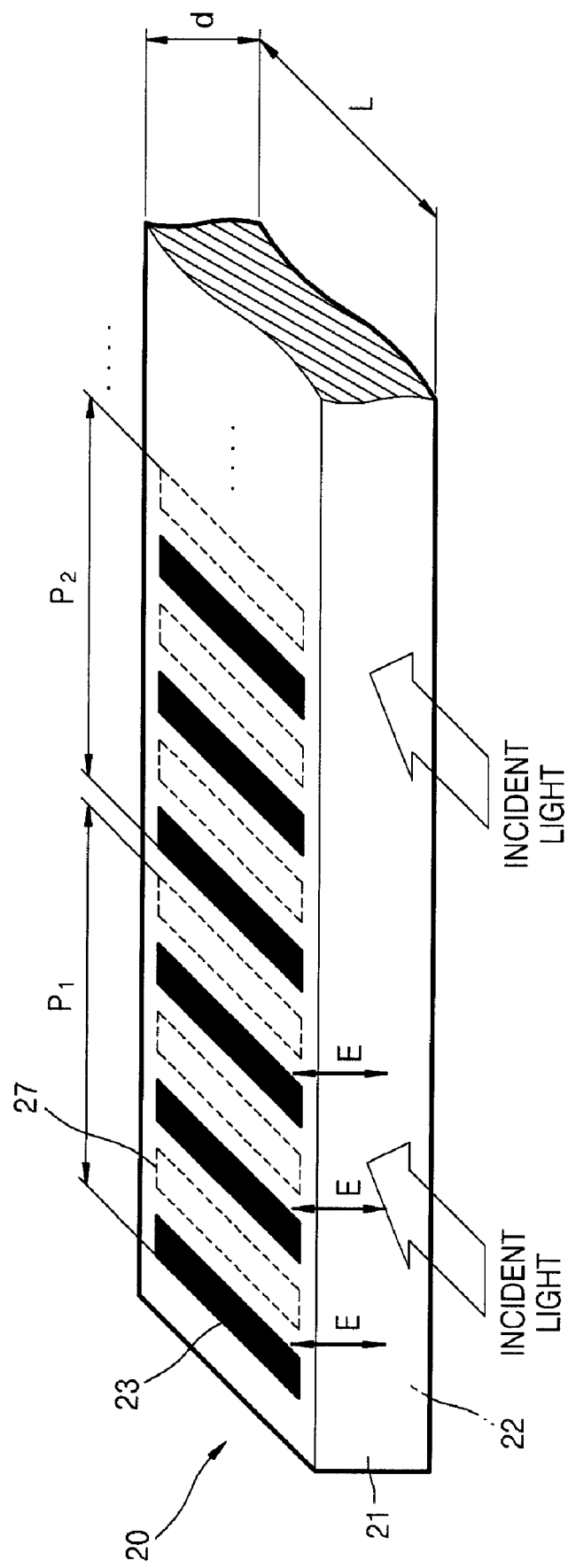
FIG. 4 is a perspective view showing a conceptual structure of a transmissive active grating device according to an exemplary embodiment of the present invention.

FIG. 4 is a perspective view showing a conceptual structure of a transmissive active grating device 20 according to an exemplary embodiment of the present invention. Referring to FIG. 4, the transmissive active grating device 20 according to the current embodiment includes a light transmissive electro optical material layer 21, a common electrode 22 formed on a bottom surface of the electro optical material layer 21, and an array of a plurality of grating electrodes 23 arranged in parallel with each other on a top surface of the electro optical material layer 21. As denoted by an arrow in FIG. 4, the light is incident onto and exits through side surfaces of the electro optical material layer 21, on which the common electrode 22 and the grating electrodes 23 are not formed.

The electro optical material layer 21 can be formed of an electro optical crystal that transmits the light and has a refractive index changed by an electric field. The electro optical crystal has a refractive index that is changed by an electric field, in accordance with the Kerr effect. In the present invention, an electro optical crystal, for example, LiNbO3, KTN (K—Ta—Nb), or KLTN(K—Li—Ta—Nb; potassium lithium tantalate niobate), can be used as the electro optical material layer 21.

The common electrode 22 can be an electrode formed on the entire bottom surface of the electro optical material layer 21. As shown in FIG. 4, the grating electrodes 23 are formed on the top surface of the electro optical material layer 21 in a direction perpendicular to the light incident surface. The grating electrodes 23 are formed in parallel with each other arranged along a width direction of the electro optical material layer 21 to form an array.

In the present embodiment, a predetermined distance exists between two adjacent grating electrodes 23. The distance between the two adjacent grating electrodes 23 may be equal to or greater than the width of the grating electrode 23. In FIG. 4, empty electrodes 27, formed in the same shape as the grating electrodes 23 on the regions where the grating electrodes 23 are not formed on the top surface of the electro optical material layer 21, are represented by dotted lines between the grating electrodes. Then, according to the current embodiment of FIG. 4, it can be understood to one skilled in the art that the grating electrodes 23 and the empty electrodes 27 are alternately arranged on the top surface of the electro optical material layer 21. For example, when a length (L) of the electro optical material layer 21 is about 0.5 mm and a thickness (d) of the electro optical material layer 21 is about 0.1 mm, the width of each of the grating electrodes 23 and the empty electrodes 27 can be set to be about 3 µm, and the distance between the grating electrodes 23 and the empty electrodes 27 can be set to be about 1 µm. In this case, the distance between two adjacent grating electrodes 23 is about 5 µm.

According to this exemplary embodiment of the present invention, the voltage can be independently applied to each of the grating electrodes 23, and thus, the refractive index in portions of the electro optical material layer 21 can be adjusted as necessary. In particular, when the transmissive active grating device 20 is used as an optical modulator in a laser printer or a display device, some of the grating electrodes 23 that are adjacent to each other can correspond to a pixel of the laser printer or the display device. That is, a predetermined number of grating electrodes 23 that are adjacent to each other may form an array set, and the voltage can be applied independently to each of the array sets. Then, a dark/bright state of the pixels in the laser printer or the display device can be independently controlled. For example as shown in FIG. 4, three grating electrodes 23 can be an array set that is set to correspond to a pixel P1 or a pixel P2.

Figure 5:
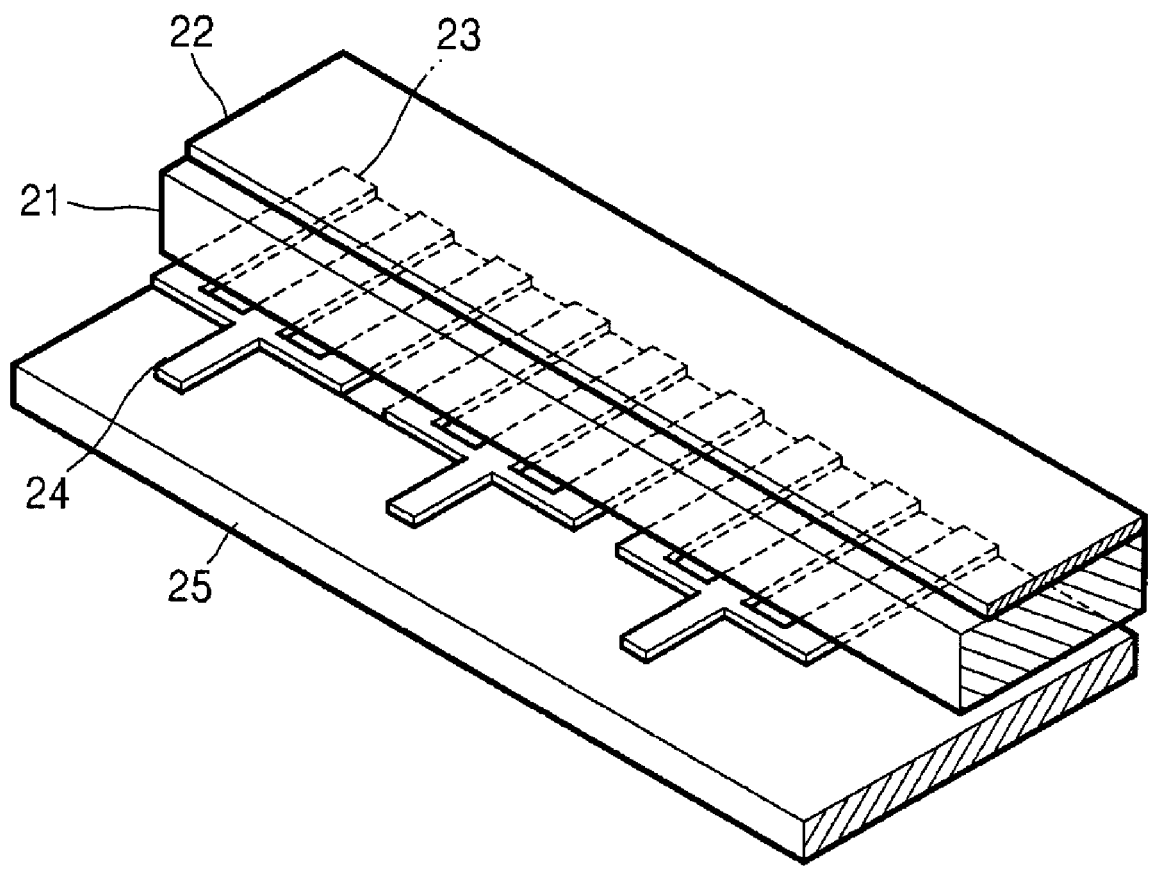
FIG. 5 is a perspective view of a transmissive active grating device, according to an exemplary embodiment of the present invention.

An example of the transmissive active grating device 20 is shown in FIG. 5. Referring to FIG. 5, the grating electrodes 23 are arranged in parallel with each other on a substrate 25. In addition, three grating electrodes 23 corresponding to a pixel are electrically connected to an electrode pad 24. That is, three grating electrodes 23 are extended as branches from one electrode pad 24. Therefore, when the voltage is applied to the electrode pad 24, the voltage can be simultaneously applied to the array set of the three grating electrodes 23 that are electrically connected to the electrode pad 24. The electro optical material layer 21 is disposed on the grating electrodes 23, and the common electrode 22 is formed on the electro optical material layer 21. In this structure, the voltage can be independently applied to each of the electrode pads 24. Therefore, the dark/bright states of the pixels in the laser printer or the display device can be independently controlled.

Figure 6:
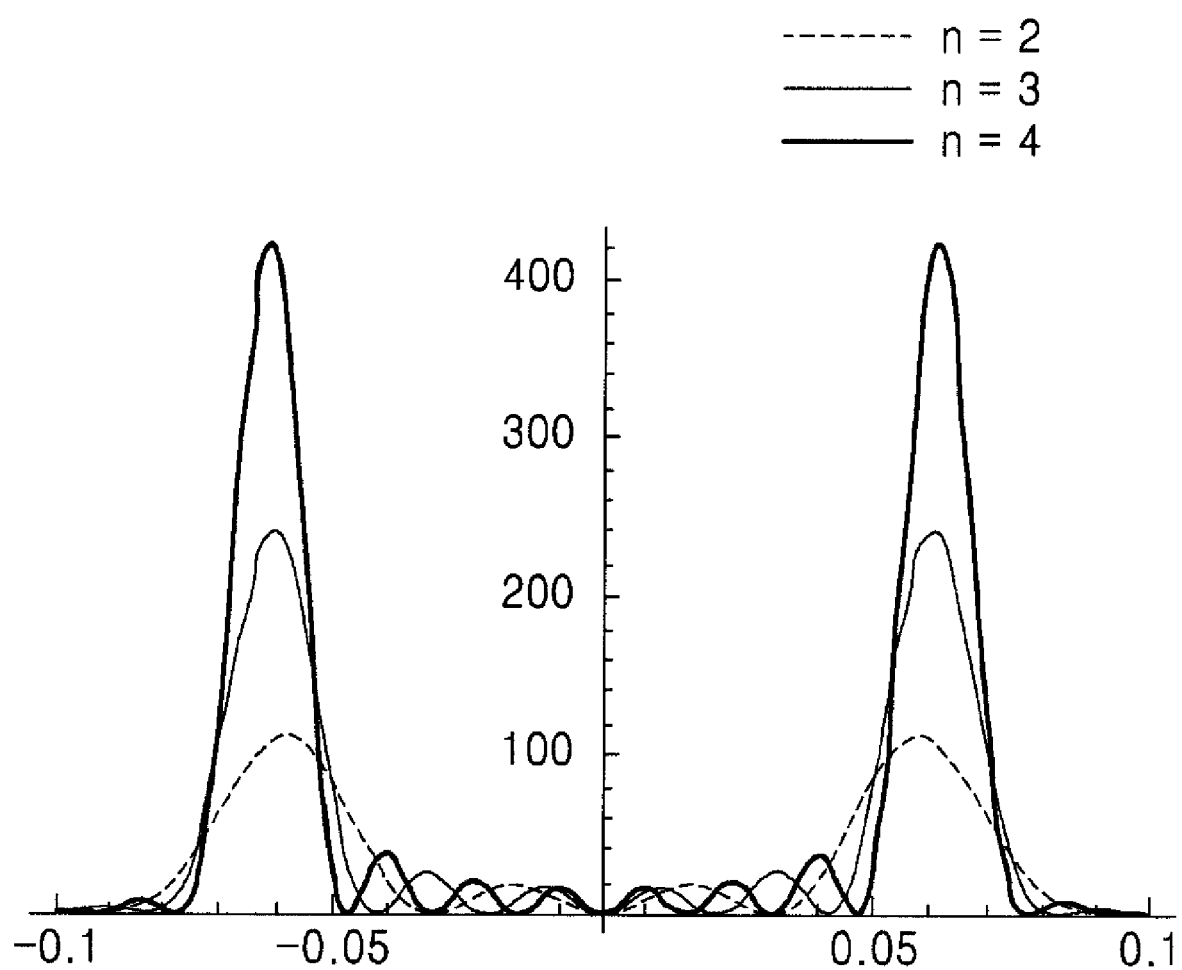
FIG. 6 is a graph showing a change in light distribution of diffracted light according to the number of grating electrodes per pixel, according to an exemplary embodiment of the present invention.

Three grating electrodes 23 correspond to one pixel in the description above, however, the present invention is not limited thereto. If the number of grating electrodes 23 corresponding to one pixel increases, the diffraction can occur more easily. FIG. 6 is a graph showing a change in the light distribution of the diffracted and transmitted light according to the number of grating electrodes 23 corresponding to one pixel in a case where the wavelength of the incident light is 0.5 µm. As shown in FIG. 6, as the number of the grating electrodes 23 increases, the sharpness of ±1st order diffracted light increases. Therefore, the number of the grating electrodes 23 corresponding to one pixel may be increased as many as possible.

Figure 7A:
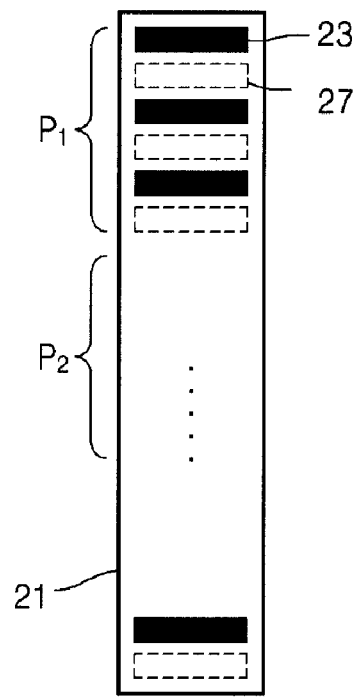
FIGS. 7A through 7D illustrate operations of the transmissive active grating device according to exemplary embodiments of the present invention.
Figure 7B:
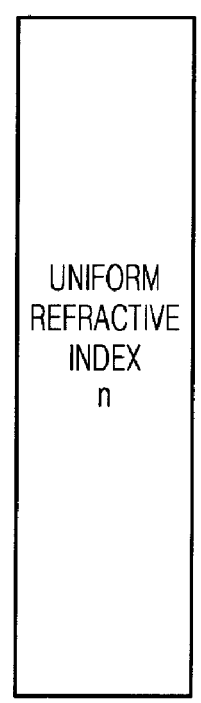
Figure 7C:
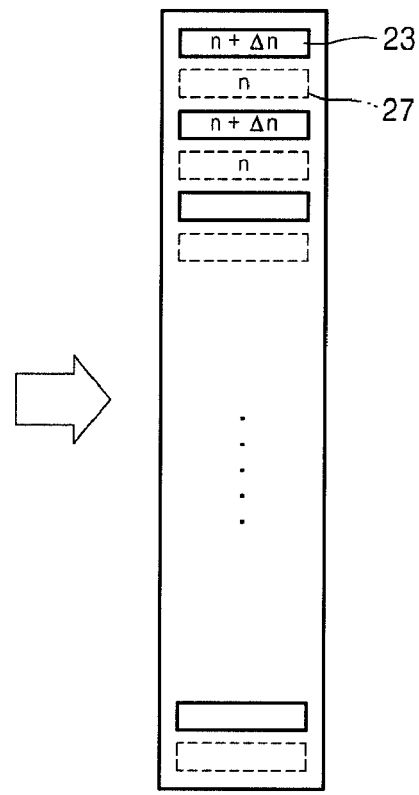
Figure 7D:
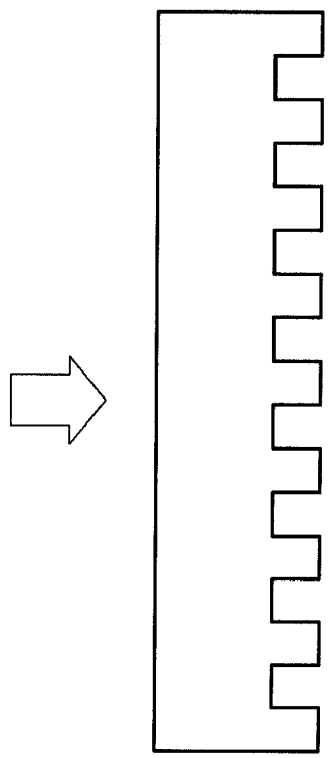
Figure 8:
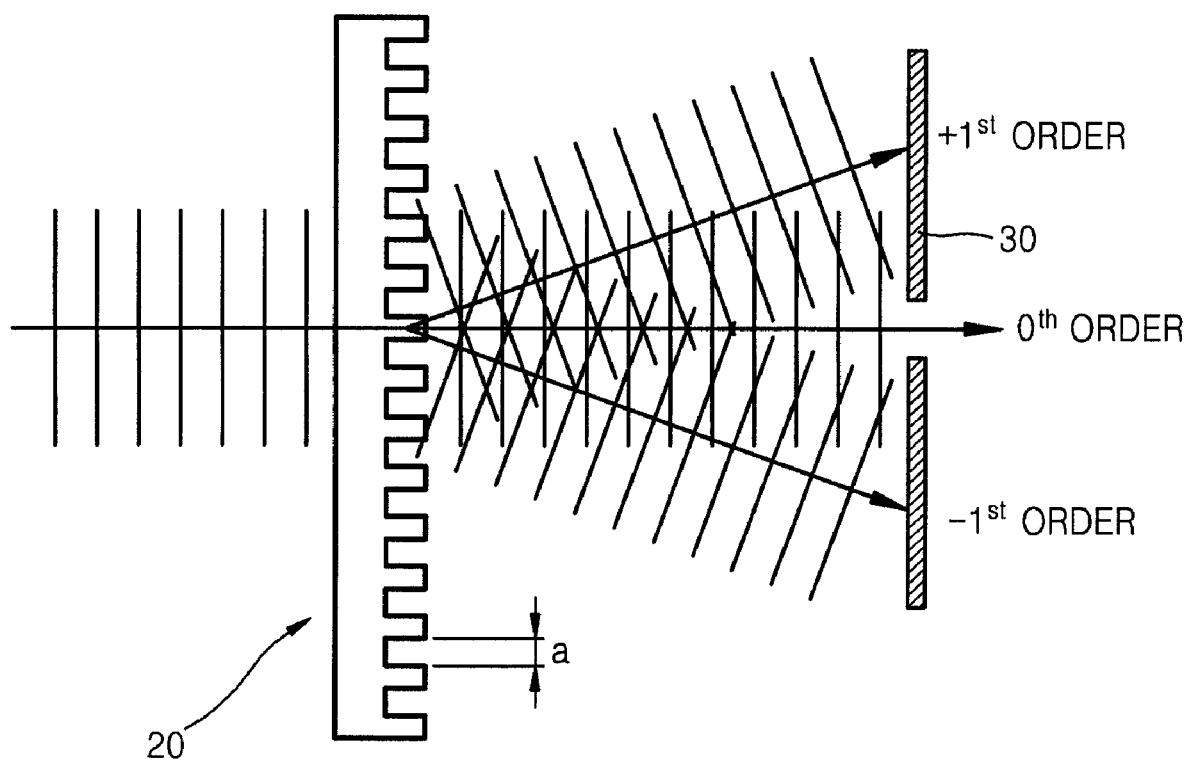
FIG. 8 is a cross-sectional view showing diffraction of transmitted light by the transmissive active grating device, according to an exemplary embodiment of the present invention.

FIGS. 7A through 7D illustrate operations of the transmissive active grating device 20 having the above-described structure, according to exemplary embodiments of the present invention. Referring to FIG. 7A, the grating electrodes 23 and the empty electrodes 27 are alternately arranged with a predetermined interval between each other on the top surface of the electro optical material layer 21. In the present embodiment, three grating electrodes 23 and three empty electrodes 27 correspond to one pixel. In this structure, if no voltage is applied to any of the grating electrodes 23, the electro optical material layer 21 can have a uniform refractive index n as shown in FIG. 7B. However, if the voltage is applied to all of the grating electrodes 23, portions of the electro optical material layer 21, where the empty electrodes 27 are formed, have the refractive index of n, however, portions of the electro optical material layer 21, where the grating electrodes 23 are formed, have a refractive index of n+Δn as shown in FIG. 7C. Consequently, when the light is incident on the electro optical material layer 21 in a direction denoted by the arrow, optical distances to the regions of the grating electrodes 23 and the regions of the empty electrodes 27 are different from each other. Therefore, the electro optical material layer 21 has a grating pattern as shown in FIG. 7D. Then, as shown in FIG. 8, the light incident on the electro optical material layer 21 can be transmitted after being separated into a 0th order diffracted light and ±1st or higher order diffracted light due to the grating pattern that is formed by the change of refractive index.

The voltage required to operate the transmissive active grating device 20 as the grating device can be calculated as follows. First, a phase delay difference (ΔΦ) between the light passing through the region of the grating electrode 23 and the region of the empty electrode 27 in the electro optical material layer 21 can be defined by the following equation 1.

$$\Delta\Phi = 2\pi/\lambda(\Delta n \cdot L) \tag{1}$$

where, $\lambda$ denotes the wavelength of the incident light, $\Delta n$ denotes a change in the refractive index, and L denotes a length of the light path. For example, when the wavelength of the incident light is $\lambda=0.5$ µm and the length (L) of the electro optical material layer 21 is 0.5 mm, the change of the refractive index is $\Delta n=5\times 10^{-4}$ in order to make a maximum phase difference of $\pi$. In a case where the electro optical material layer 21 is formed of KTN, the change of the refractive index of KTN is about $\Delta n=0.01$ when E=3 kV/cm. Therefore, the applied voltage required to obtain the refractive index change of $\Delta n=5\times 10^{-4}$ is about 1.5V if the thickness (d) of the electro optical material layer 21 is 0.1 mm. The applied voltage is much lower than a driving voltage of 30V that is required by the conventional reflective active grating device.

Figure 9:
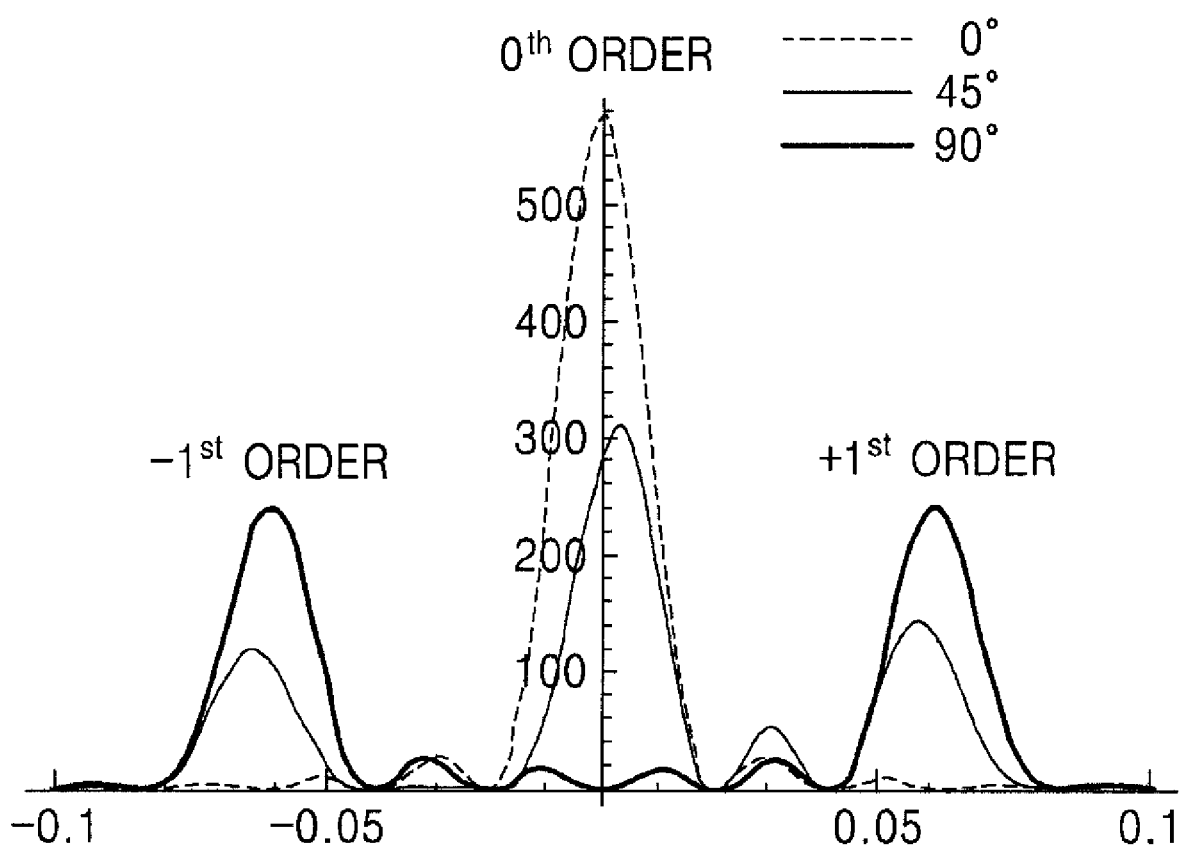
FIG. 9 is a graph showing a change in the light distribution of the diffracted light according to a phase difference of the transmitted light, according to an exemplary embodiment of the present invention.

In addition, according to the present invention, the diffracted amount of light can be adjusted by controlling the voltage that is applied to the grating electrodes 23. As described above, the refractive index change of the electro optical material layer 21 is changed according to the applied voltage to the grating electrodes 23, and the phase delay difference (ΔΦ) between the light transmitting the region of the grating electrode 23 and the region of the empty electrode 27 in the electro optical material layer is changed according to the refractive index change. FIG. 9 is a graph showing a change of the light distribution of the diffracted light according to the phase difference between the transmitted light when the wavelength of the incident light is 0.5 µm and the number of grating electrodes 23 corresponding to one pixel is 3. In this case, the distance a between the grating electrodes 23 (refer to FIG. 8) is about 4 µm. Referring to FIG. 9, if the voltage is not applied to the grating electrodes 23 and there is no phase difference (that is, 0°), diffraction hardly occurs, and thus, there is only the 0th order diffracted light. In addition, if a weak voltage is applied to the grating electrodes 23 and the phase difference is 45°, an intensity of the 0th order diffracted light is reduced, and ±1st order diffracted light is generated. If the voltage that is applied to the grating electrodes 23 is increased and the phase difference becomes 90°, an intensity of the ±1st order diffracted light is increased, however, the 0th order diffracted light rarely exists.

Therefore, if the transmissive active grating device 20 of the present invention is applied to a spatial optical modulator, the intensity of the transmitted light can be controlled according to an applied voltage. In this case, the spatial optical modulator using the transmissive active grating device 20 can further include a shutter 30 that blocks the 0th order diffracted light and transmits ±1st or higher order diffracted light, or transmits the 0th order diffracted light and shields the ±1st or higher order diffracted light.

As described above, the transmissive active grating device 20 of these exemplary embodiments has a simple structure, that is, the common and grating electrodes 22 and 23 are formed on both top and bottom surfaces of the electro optical material layer 21. Therefore, unlike the conventional reflective active grating device fabricated using a micro-electro-mechanical system (MEMS) process, the fabrication process of the transmissive active grating device of these exemplary embodiments is simple, and thus, it is easy to increase the number of electrodes corresponding to one pixel. Therefore, a contrast ratio that is higher than that of the conventional reflective active grating device can be obtained through the transmissive active grating device of these exemplary embodiments. Moreover, the transmissive active grating device of these exemplary embodiments can operate without involving a mechanical movement as in the conventional reflective active grating device, and thus, a rapid response speed of a few MHz can be obtained. In addition, there is no problem in terms of a damping oscillation that is caused by the mechanical movement, and thus, a driving mechanism for compensating for the damping oscillation is not required. In addition, as described above, the applied voltage is lower than that of the conventional art, and thus, the power consumption of the transmissive active grating device of these exemplary embodiments can be greatly reduced as compared to the conventional art.

In addition, if the transmissive active grating device of these exemplary embodiments is applied to a spatial optical modulator for a laser printer or a display device, the light path is not bent and the optical system can be simplified.

These exemplary embodiments have the following advantages.

(1) An exemplary transmissive active grating device has a simple structure, and thus, a durability of the transmissive active grating device is superior as compared to the conventional art, and the exemplary transmissive active grating device can be fabricated using a simple process.

(2) Therefore, it is easy to increase the number of electrodes corresponding to one pixel. Thus, a contrast ratio that is higher than that of the conventional art can be obtained.

(3) Since the exemplary transmissive active grating device can operate without involving a mechanical movement, a rapid response speed of a few MHz can be obtained.

(4) In addition, there is no damping oscillation caused by the mechanical movement, and thus, a driving mechanism for compensating for the damping oscillation is not required.

(5) The exemplary transmissive active grating device may use a voltage that is lower than that of the conventional art, and thus, the power consumption of the exemplary transmissive active grating device can be greatly reduced as compared to the conventional art.

(6) If the exemplary transmissive active grating device is applied to a spatial optical modulator for a laser printer or a display device, the optical system can be simplified.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A transmissive active grating device comprising:
   an electro optical material layer which transmits light;
   a first electrode formed on a bottom surface of the electro optical material layer; and an array of a plurality of second electrodes arranged on a top surface of the electro optical material layer, wherein the plurality of second electrodes are arranged in parallel with each other, wherein the light is incident onto and exits through side surfaces of the electro optical material layer on which the first and second electrodes are not formed, and wherein the transmissive active grating device transmits or diffracts the incident light according to a voltage applied to the first and second electrodes.

2. The device of claim 1, wherein the second electrodes are arranged with a predetermined interval therebetween.

3. The device of claim 2, wherein a distance between the second electrodes is equal to the width of a second electrode or greater.

4. The device of claim 1, wherein a voltage is applied independently to each of the second electrodes.

5. The device of claim 1, wherein the electro optical material layer that transmits the light is formed of at least one of KLTN, $LiNbO_3$, and KTN.

6. A transmissive active grating device comprising:

an electro optical material layer which transmits light;

a first electrode formed on a bottom surface of the electro optical material layer; and an array of a plurality of second electrodes arranged on a top surface of the electro optical material layer, wherein the plurality of second electrodes are arranged in parallel with each other, and wherein a predetermined number of second electrodes that are adjacent to each other form an array set, and a voltage is applied independently to each array set.

7. The device of claim 6, wherein the second electrodes in an array set are electrically connected to one electrode pad.

8. A spatial optical modulator that modulates incident light according to an input signal, the spatial optical modulator comprising:

a transmissive active grating device comprising an electro optical material layer which transmits light; a first electrode formed on a bottom surface of the electro optical material layer; and an array of a plurality of second electrodes arranged on a top surface of the electro optical material layer, wherein the plurality of second electrodes are arranged in parallel with each other; and a shutter that blocks a 0th order diffracted light and transmits ±1st or higher order diffracted light of the light transmitted through the transmissive active grating device, or transmits the 0th order diffracted light and shields the ±1st or higher order diffracted light.

9. The spatial optical modulator of claim 8, wherein the second electrodes are arranged with a predetermined interval therebetween.

10. The spatial optical modulator of claim 9, wherein a distance between the second electrodes is equal to the width of a second electrode or longer.

11. The spatial optical modulator of claim 8, wherein a predetermined number of second electrodes that are adjacent to each other form an array set, and a voltage is applied independently to each array set of the second electrodes.

12. The spatial optical modulator of claim 11, wherein the second electrodes in an array set are electrically connected to one electrode pad.

13. The spatial optical modulator of claim 8, wherein the electro optical material layer that transmits the light is formed of at least one of KLTN, $LiNbO_3$, and KTN.

* * * * *